United States Patent
Henkhaus et al.

(10) Patent No.: US 6,654,895 B1
(45) Date of Patent: Nov. 25, 2003

(54) ADAPTIVE POWER MANAGEMENT IN A COMPUTING SYSTEM

(75) Inventors: Ralph Henkhaus, Portland, OR (US); Doug Gabel, Hillsboro, OR (US); David C. Stewart, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/436,298

(22) Filed: Nov. 8, 1999

(51) Int. Cl.⁷ .............................................. G06F 1/26
(52) U.S. Cl. ..................... 713/320; 713/320; 713/323; 710/18
(58) Field of Search ........................... 713/1, 323, 322, 713/320, 321; 710/15, 16, 18

(56) References Cited

U.S. PATENT DOCUMENTS

| | | | | |
|---|---|---|---|---|
| 5,542,035 A | * | 7/1996 | Kikinis et al. ............... | 700/296 |
| 5,673,202 A | * | 9/1997 | Baldenweg et al. ......... | 700/295 |
| 6,324,182 B1 | * | 11/2001 | Burns et al. ................ | 370/429 |
| 6,330,069 B1 | * | 12/2001 | Kim ........................... | 358/1.14 |
| 6,412,069 B1 | * | 6/2002 | Kavsan ....................... | 713/164 |

* cited by examiner

Primary Examiner—Thomas Lee
Assistant Examiner—Yasin Barqadle
(74) Attorney, Agent, or Firm—Schwegman, Lundberg, Woessner & Kluth, P.A.

(57) ABSTRACT

A software application for executing on a computing system that monitors a user's behavior and adapts the power management policies to the user's preferences in an automated manner. The software application records a time of day whenever the computing system transitions from a current power state to a new power state as a result of an action initiated by a user, such as when the user activates the computing system. The software application includes a pattern-detection software module to detect a usage pattern within the recorded times and predicts when the user is likely to activate the computing system. Based on this prediction, the software application automatically transitions the computing system to a higher power state prior to the predicted startup time, thereby allowing the computing system to be "instantly" available for use when accessed by the user.

35 Claims, 3 Drawing Sheets

ADAPTIVE POWER MANAGEMENT IN A COMPUTING SYSTEM

TECHNICAL FIELD

This invention relates generally to the field of data processing and, more particularly, to an adaptive power management system for a computing system such as a desktop, laptop or hand-held computer.

BACKGROUND INFORMATION

Recently there has been a strong industry push toward developing an instantly-available personal computer (IAPC). The goal is to have a high-performance, feature-rich PC that is power efficient when both active and idle, always connected even when "off," and instantly available to users whenever needed. The IAPC could be a desktop computer located at home or at an office, a laptop computer or even a small, resource limited computer, known as a handheld personal computer (H/PCs).

The IAPC would have several advantages over conventional computers. For example, the IAPC will appear to be off in that there is no noise due to fans or disk drives, yet it can snap back to its fully ready state within seconds of the push of a button. Ideally, the IAPC will be able to respond to the phone ringing in time to fully service the call for voice, fax or answering machine applications. Other advantages will include keeping the PC completely connected to a network even when the PC is "off". Thus, file sharing, print server and web server applications will be able to function even when the PC is "off".

Several industry standards have been developed in quest of the IAPC. For example, the Advance Configuration and Power Interface (ACPI) provides a standard yet flexible interface between hardware and applications to communicate their power management scheme and introduce a new methodology to the scheme as well.

An IAPC will have a set of power states that vary from a fully on or working state to various power saving "sleeping" system states. For example, ACPI defines a working state G0 and five sleeping states designated as S1–S5.

More specifically, S1 is a low wake-up latency sleeping system power state of the computing system 100 where the processor 112 is halted and is no longer executing instructions. However, bits of volatile information within the processor 112 (processing context) and RAM 115 are maintained in the S1 power state. In transitioning from S1 to G0, processor 112 preferably restarts execution from the instruction where it halted.

The S2 power state is also a low wake-up latency sleeping system power state similar to S1, except processing context is lost. From this state, the processor typically restarts execution from a waking vector stored in a predetermined memory location.

The S3 power state, also referred to as "Suspend to RAM", is a low wake-up latency sleeping system power state where all system context is lost except for system memory. All bits of volatile information within each of the devices (device context) are lost in this state. In this transition, the processor 112 preferably restarts execution from a waking vector stored similar to waking from the S2 state. The S3 power state is ideal for the IAPC in that in this state over 80% of the PC's power is shut off.

The S4 power state is called a system hardware context lost power state of the computing system 100 where all system context, device context, processor context, and dynamic memory, such as RAM 115, is lost. The S5 state is similar except that the IAPC is in a "soft off" state and requires a complete boot when awakened.

Unfortunately, due to limitations of conventional computing systems the goal of an instantly available PC is difficult to achieve. For example, a PC put to sleep in the S3 state may require up to 12 seconds to become available to the user, which is unacceptable.

For the reasons stated above, and for other reasons stated below which will become apparent to those skilled in the art upon reading and understanding the present specification, there is a need in the art for a system that addresses these short comings. There is a need for a power management system that helps achieve the goals of the instantly available PC.

SUMMARY OF THE INVENTION

As explained in detail below, the invention is directed to a software application executing on a computing system. The software application monitors a user's behavior and adapts the power management policies to the user's preferences in an automated manner. The software application records a time of day whenever the computing system transitions from a current power state to a new power state as a result of an action initiated by a user, such as when the user activates the computing system. The software application includes a pattern-detection software module to detect a usage pattern within the recorded times and predicts when the user is likely to activate the computing system. Based on this prediction, the software application automatically transitions the computing system to a higher power state prior to the predicted startup time. As a result, the invention facilitates the "instant" availability of the computing system when accessed by the user.

DETAILED DESCRIPTION

In the following detailed description, references are made to the accompanying drawings that illustrate specific embodiments in which the invention may be practiced. Electrical, mechanical, programmatic and structural changes may be made to the embodiments without departing from the spirit and scope of the present invention. The following detailed description is, therefore, not to be taken in a limiting sense and the scope of the present invention is defined by the claims.

Figure 1:
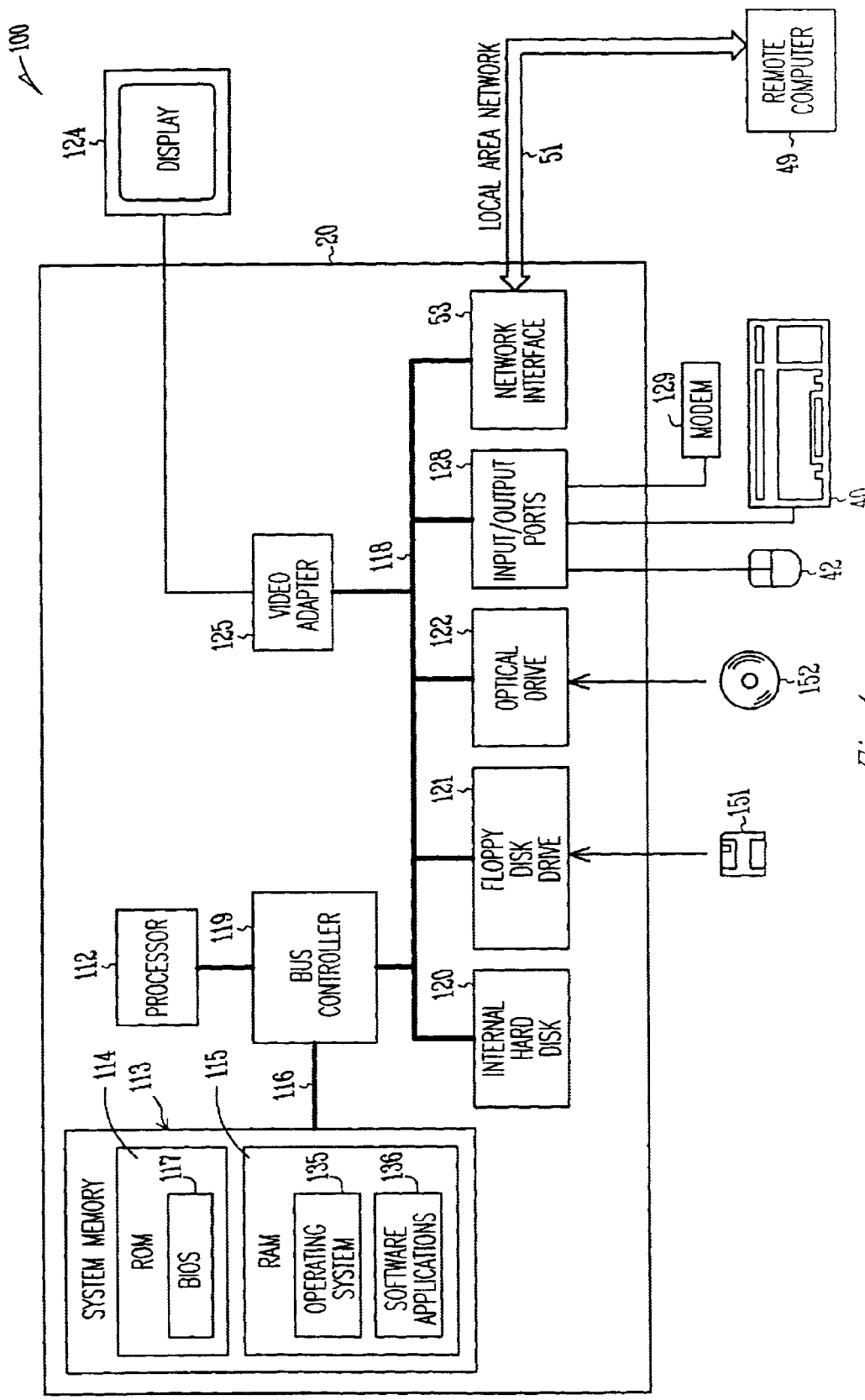
FIG. 1 is a diagram showing functional components of a computing system suitable for incorporating a user-adaptive power management system.

FIG. 1 illustrates a computing system 100 suitable for supporting the operation of an embodiment of the present invention. As shown in FIG. 1, the computing system 100 includes a processor 112 that in one embodiment belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. Computing system 100 represents any personal computer, laptop or even a battery-powered, pocket-sized, mobile computer known as a hand-held PC.

The computing system 100 includes system memory 113 (including read only memory (ROM) 114 and random access memory (RAM) 115), which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the computing system 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125.

A user, enters commands and information into the computing system 100 by using a keyboard 40 and/or pointing device, such as a mouse 42, which are connected to bus 118 via input/output ports 128. Other types of pointing devices (not shown in FIG. 1) include track pads, track balls, joy sticks, data gloves, head trackers, and other devices suitable for positioning a cursor on the video display 124.

As shown in FIG. 1, the computing system 100 also includes a modem 129. Although illustrated in FIG. 1 as external to the computing system 100, those of ordinary skill in the art will quickly recognize that the modem 129 may also be internal to the computing system 100. The modem 129 is typically used to communicate over wide area networks (not shown), such as the global Internet.

Software applications 136 and data are typically stored via one of the memory storage devices, which may include the hard disk 120, floppy disk 151, CD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. For example, when the user wants to load a software application 136, the operating system 135 interprets the instruction and causes the processor 112 to load software application 136 into RAM 115 from either the hard disk 120 or the optical disk 152. Once software application 136 is loaded into the RAM 115, it can be used by the processor 112. In case of large software applications 136, processor 112 loads various portions of program modules into RAM 115 as needed.

The Basic Input/Output System (BIOS) 117 for the computing system 100 is stored in ROM 114 and is loaded into RAM 115 upon booting. Those skilled in the art will recognize that the BIOS 117 is a set of basic executable routines that have conventionally helped to transfer information between the computing resources within the computing system 100. These low-level service routines are used by operating system 135 or other software applications 136.

In one embodiment computing system 100 includes a registry (not shown) which is a system database that holds configuration information for computing system 100. For example, Windows® 95 and Windows® NT by Microsoft maintain the registry in two hidden files, called USER.DAT and SYSTEM.DAT, located on a permanent storage device such as an internal disk.

As described in detail below, in order to facilitate the instant availability of computing system 100 a software application 136 monitors user behavior and adapts power management policies to the user's preferences in an automated manner. More specifically, the software application records a time of day whenever computing system 100 transitions from a current power state to a new power state as a result of an action initiated by a user, such as when the user activates computing system 100. The software application 136 detects usage patterns within the recorded times and predicts when the user is likely to activate the computing system. Based on this prediction, the software application automatically transitions the computing system to a higher power state prior to the predicted startup time, thereby allowing the computing system to be "instantly" available for use when accessed by the user.

Figure 2:
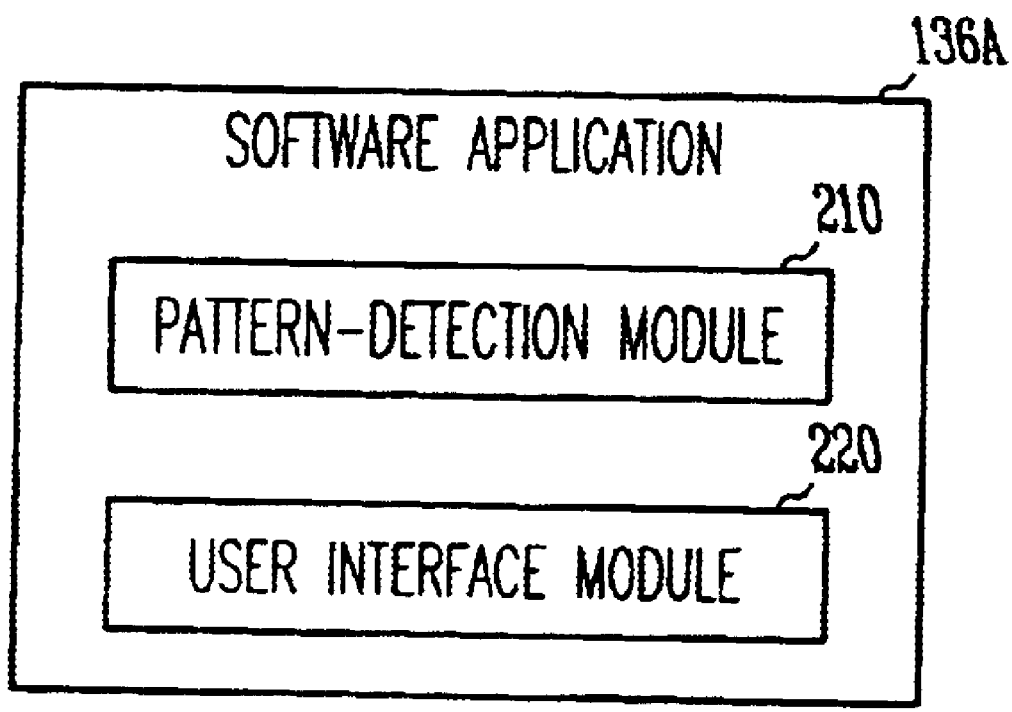
FIG. 2 further illustrates one embodiment of a software application suitable for executing on the computing system of FIG. 1 and which incorporates software modules for user-adaptive power management.

FIG. 2 further illustrates one embodiment of a software application 136A that incorporates software modules for user-adaptive power management. More specifically, software application 136A includes pattern-detection module 210 and user interface 220.

Software application 136A observes and records the user's behavior over a period of time. For example, when the user activates computing system 100, such as by physically turning on computing system 100, awakening, etc., software application 136A records the time of day, the current power level and new power level to a storage device such as internal hard disk 120.

Either periodically or when a certain event occurs, such as when the user activates computing system 100, pattern detection module 210 analyzes the recorded times in order to detect a usage pattern as a function of the time of day. In one embodiment pattern-detection module 210 identifies one or more typical startup times when the user is likely to activate the computing system 100. An example of such a usage pattern would be that the user always powers up computing system 100 at approximately 8:00 AM from power state S5 to power state S1. Another example would be that the user suspends computing system 100 at approximately 11:30 AM from power state S1 to power state S3 and then activates computing system 100 at approximately 1:00 PM.

If a pattern is detected then user interface module 220 offers the user the opportunity to automatically transition computing system 100 according to the detected pattern. For example, in one embodiment user interface module 220 offers the user the option of proactively "warming up" the system to a higher power state before a predicted startup time such as at 8:00 AM. Thus, the user may select the option or chose to disable the automatic warm-up. In one embodiment software application 136A suppresses user interface module 220 such that the action is taken without requiring user input.

In order to transition computing system 100 to a new power state at a future time, software application 136A sets a timer to fire at the appropriate time. In one embodiment, software application 136A configures a real-time clock to trigger a wake event at the appropriate time. This embodiment is advantageous in that the wake event is hardware driven and does not require the execution of software application 136A.

Once software application 136A has awakened and automatically transitioned computing system 100 to a new power state, software application 136A monitors whether the user actually uses computing system 100 within a period of time. The failure of the user to use computing system 100 on several occasions indicates a change in behavior and pattern-detection module 210 disables the automatic transition. For example, if on several occasions the user fails to use computing system 100 after software application 136A has automatically activated it then pattern-detection module 210 disables the warm-up option. In one embodiment this "back-off" option may be disabled by the user.

Pattern detection module 210 is a field replaceable software module such that new pattern detection algorithms may be easily added to computing system 100. In addition, software application 136A, including pattern-detection module 210 and user interface module 220, may be incorporated into operating system 135.

Figure 3:
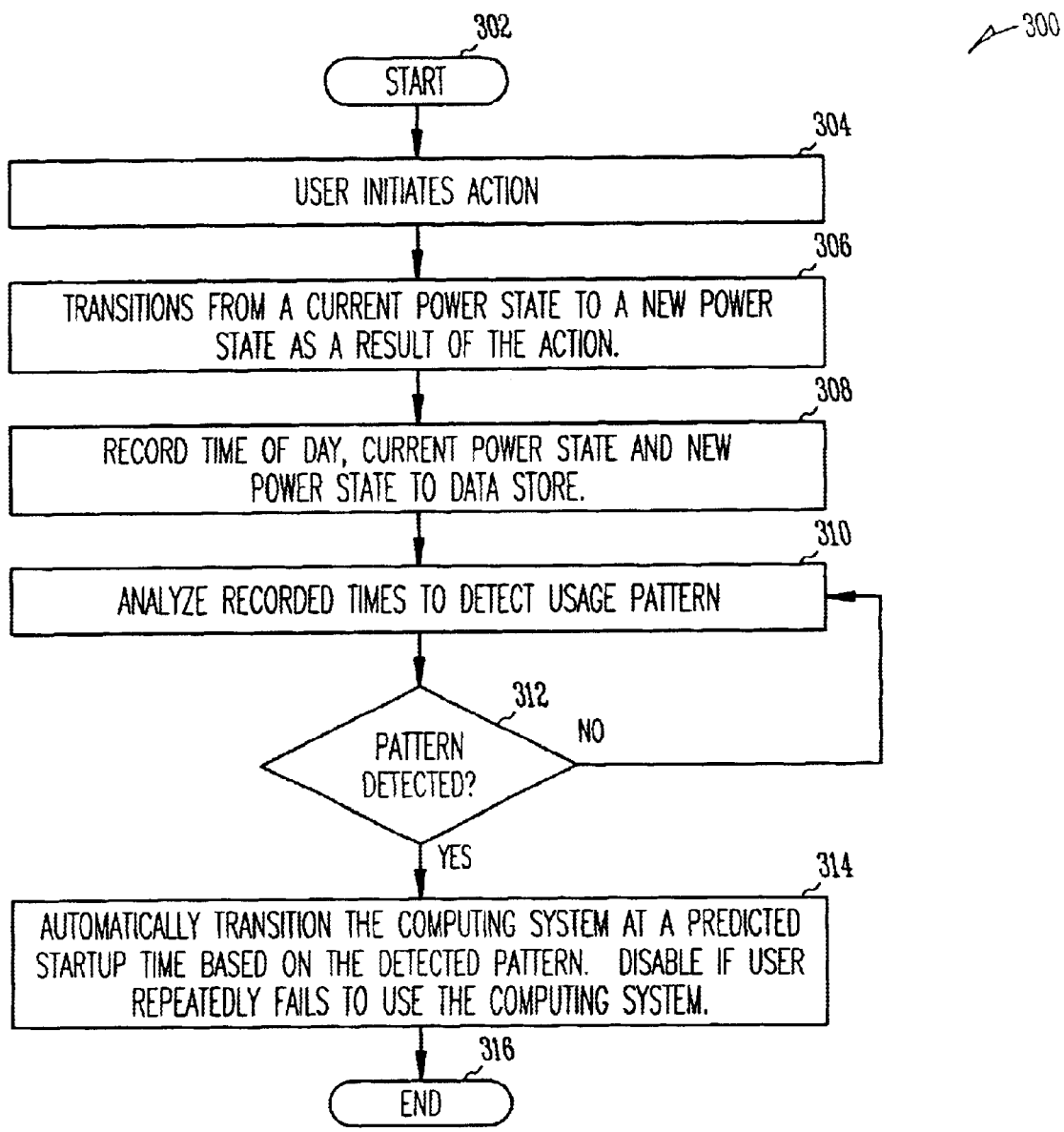
FIG. 3 is a flow chart illustrating one mode of operation of a computing system incorporating the inventive user-adaptive power management software and system described herein.

FIG. 3 is a flow chart illustrating method 300 for managing power in a computing system 100 according to the invention. The method 300 begins in block 302 and proceeds to block 304 in which the user initiates some action, such as activating (turning on or unsuspending) or deactivating (turning off or suspending) computing system 100. In block 306, this action causes computing system 100 to transition from a current power state to a new power state as a result of the user action. In block 308, software application 136A records in a storage device the time of day, the current power level and new power level. Software application 136A repeats blocks 304, 306 and 308 unless disabled by the user.

In block 310 pattern-detection module 210 analyzes the recorded times in order to detect a usage pattern. Pattern-detection module 210 can perform the analysis periodically or, in one embodiment, the analysis is performed each time computing system 100 is activated.

In block 312 software application 136A determines whether pattern-detection module 210 has detected a pattern within the recorded times. If so, software application 136A proceeds to block 314 and presents user interface 220, thereby giving the user the option to automatically perform the action. For example, in one embodiment software application 136A presents the user with an option to automatically "warm-up" computing system 100 at the predicted startup time. In another embodiment software application 136A suppresses the user interface such that when a pattern is detected software application 136A configures itself to automatically perform the action at the detected typical action time.

If pattern-detection module 210 has not detected a pattern then software application 136A returns to block 310 and repeats the analysis at a subsequent time, such as the next time computing system 100 is activated.

In block 314, software application 136A automatically transitions the computing system from a current power state to a new power state. For example, software application 136A automatically transitions the computing system to a higher power state at the beginning of a warm-up period prior to the predicted startup time. If the user repeatedly fails to use computing system 100 then pattern-detection module 210 disables the automatic transition.

Various embodiments have been described of a user adaptive power management system. A software application executing on the computing system monitors a user's behavior and adapts the power management policies to the user's preferences in an automated manner. The software application includes a pattern-detection software module to detect a usage pattern and to predict when the user is likely to activate the computing system. In one embodiment the software application includes a user interface module by which the user can enable or disable automatic warm-up and back-off options. The software application can be a stand-alone application executing on the computing system or, in another embodiment, the software application, including the pattern-detection module and the user interface module, can be incorporated into the operating system. This application is intended to cover any adaptation or variation of the present invention. It is intended that this invention be limited only by the claims and equivalents thereof.

We claim:

1. A method, comprising:
   repeatedly recording a time of day when a computing system transitions from a current power state to a new power state as a result of an action initiated by a user;
   recording the current power state and the new power state;
   detecting a usage pattern as a function of the recorded times; and
   transitioning the computing system from a current power state to a new power state based on the detected usage pattern, including transitioning the computer system from the current power state to a higher power state below the new power state.

2. The method of claim 1, wherein detecting a usage pattern includes predicting, as a function of the recorded times, a startup time when the user is likely to activate the computing system.

3. The method of claim 2, wherein transitioning the power state includes automatically transitioning the computing system to the a higher power state at the beginning of a warm-up period prior to the predicted startup time.

4. The method of claim 3, wherein the warm-up period has a duration that is user configurable.

5. The method of claim 3 and further including maintaining a user-configurable setting specifying whether to transition the computing system to the higher power state.

6. The method of claim 2 further including transitioning the computing system to a lower power state when the user fails to activate the computing system within a timeout period after the predicted startup time.

7. The method of claim 6 and further including increasing the duration of the timeout period upon successive failures by the user to activate the computing system.

8. The method of claim 6, and further including maintaining a user-configurable setting specifying whether to transition the computing system to the lower power state when the user fails to activate the computing system within a timeout period after the warm-up period.

9. The method of claim 1 wherein transitioning the computing system to the new power state occurs in response to a wake event generated by a real-time clock.

10. A computing system comprising:

a storage device; and a software application for executing on the computing system to repeatedly record a time of day, a current power state, and a new power state to the storage device when the computing system transitions from the current power state to the new power state as a result of an action initiated by a user, wherein the software application includes a pattern-detection software module to detect a usage pattern within the recorded times, including transitioning the computer system from the current power state to a higher power state below the new power state.

11. The computing system of claim 10, wherein as a function of the recorded times the pattern-detection module predicts a startup time that indicates when the user is reasonably likely to power up the computing system.

12. The computing system of claim 11, wherein the software application automatically transitions the computing system to the a higher power state at the beginning of a warm-up period prior to the predicted startup time.

13. The computing system of claim 12, wherein the warm-up period has a duration that is user configurable.

14. The computing system of claim 12, wherein the software application maintains a user-configurable setting specifying whether to transition the computing system to the higher power state at the beginning of the warm-up period.

15. The computing system of claim 10, wherein the software application is a module within an operating system.

16. The computing system of claim 10, wherein the software application is executed by an operating system of the computing system.

17. The computing system of claim 12, wherein the software application transitions the computing system to a lower power state when the user fails to activate the computing system within a timeout period after the predicted startup time.

18. The computing system of claim 17, wherein the shutdown period has a duration that is user configurable.

19. The computing system of claim 17, Wherein recording the software application increases the duration of the timeout period upon successive failures by the user to activate the computing system.

20. The computing system of claim 17, wherein the software application maintains a user-configurable setting specifying whether to transition the computing system to the lower power state when the user fails to activate the computing system within a timeout period after the warm-up period.

21. The computing system of claim 10, wherein the pattern-detection module is field replaceable.

22. The computing system of claim 12 and further including a real-time clock, wherein the software application configures the real-time clock to trigger a wake event, and further wherein the software application automatically transitions the computing system to the higher power state in response to the wake event.

23. A computer-readable medium having computer-executable instructions to cause a computer to manage power by performing the method of:

repeatedly recording a time of day, a current power state, and a new power state when the computing system transitions from the current power state to the new power state as a result of an action initiated by a user;

detecting a usage pattern as a function of the recorded times; and transitioning the computing system from a current power state to a new power state based on the detected pattern, including transitioning the computer system from the current power state to a higher power state below the new power state.

24. The computer-readable medium of claim 23 further including computer-executable instructions to cause a computer to predict, as a function of the recorded times, a startup time when the user is likely to activate the computing system.

25. The computer-readable medium of claim 24 further including computer-executable instructions to cause a computer to automatically transition to the a higher power state at the beginning of a warm-up period prior to the predicted startup time.

26. The method of claim 1, further comprising:

transitioning the computing system from a first sleeping state to a second sleeping state.

27. The method of claim 1, further comprising:

offering a user selection option to transition the computing system from the current power state to the new power state based on the detected usage pattern.

28. The method of claim 1, wherein recording the current power state and the new power state further comprises:

recording the current power state and the new power state to a storage device.

29. The method of claim 1, wherein detecting a usage pattern as a function of the recorded times further comprises:

performing an analysis of the recorded times on a basis selected from a periodic basis and each time the computing system is activated.

30. The computing system of claim 10, wherein the software application is to record the current power state and the new power state to the storage device.

31. The computer-readable medium of claim 23 further including computer-executable instructions to cause a computer to transition the computing system from a first sleeping state to a second sleeping state.

32. The computer-readable medium of claim 23 further including computer-executable instructions to cause a computer to offer a user selection option to transition the computing system from the current power state to the new power state based on the detected usage pattern.

33. The computer-readable medium of claim 23 further including computer-executable instructions to cause a computer to record the current power state and the new power state to a storage device.

34. The computer-readable medium of claim 23 further including computer-executable instructions to cause a computer to perform an analysis of the recorded times on a basis selected from a periodic basis and each time the computing system is activated.

35. The computer-readable medium of claim 23 wherein the computer-executable instructions to cause a computer to detect a usage pattern as a function of the recorded times are included in a field replaceable software module.

* * * * *